United States Patent [19]

Catalano

[11] 4,217,941
[45] Aug. 19, 1980

[54] KETCHUP RAPPING APPARATUS
[76] Inventor: Vitale Catalano, 1301 57th St., Brooklyn, N.Y. 11219
[21] Appl. No.: 965,527
[22] Filed: Dec. 1, 1978
[51] Int. Cl.³ .......................... B65B 3/06; B67C 3/02
[52] U.S. Cl. .................................... 141/372; 141/319; 141/364; 141/375; 211/74; 211/85
[58] Field of Search ............... 141/106, 319, 364, 363, 141/365, 366, 369–381; 211/74, 85

[56] References Cited
U.S. PATENT DOCUMENTS

| 795,636 | 7/1905 | Mikorey | 141/319 |
| 2,536,419 | 1/1951 | Brunell et al. | 141/364 |

Primary Examiner—Houston S. Bell, Jr.
Attorney, Agent, or Firm—Nicholas J. Garofalo

[57] ABSTRACT

Ketchup rapping apparatus having a pair of L-form racks hinged to one another, each adapted to hold a ketchup bottle in a stationary seated position, one of the racks being pivotable through 180 degrees from a back-to-back relationship with the other rack to carry its bottle to inverted vertical alignment with the other bottle, a resilient guide cup to be disposed between the mouth ends of the aligned bottles for avoiding glass-to-glass bottle contact and for guiding the bottle being inverted down into the aligned position with the other bottle, a latch for securing the pivoted rack in the inverted position to allow easy porting of the apparatus in the inverted condition, and shock absorbing pads on the bottom of the non-inverted rack enabling rapping of the latter in the inverted condition of the apparatus against a solid surface so as to jar free a clogged ketchup flow condition without damaging the apparatus or the bottles.

11 Claims, 6 Drawing Figures

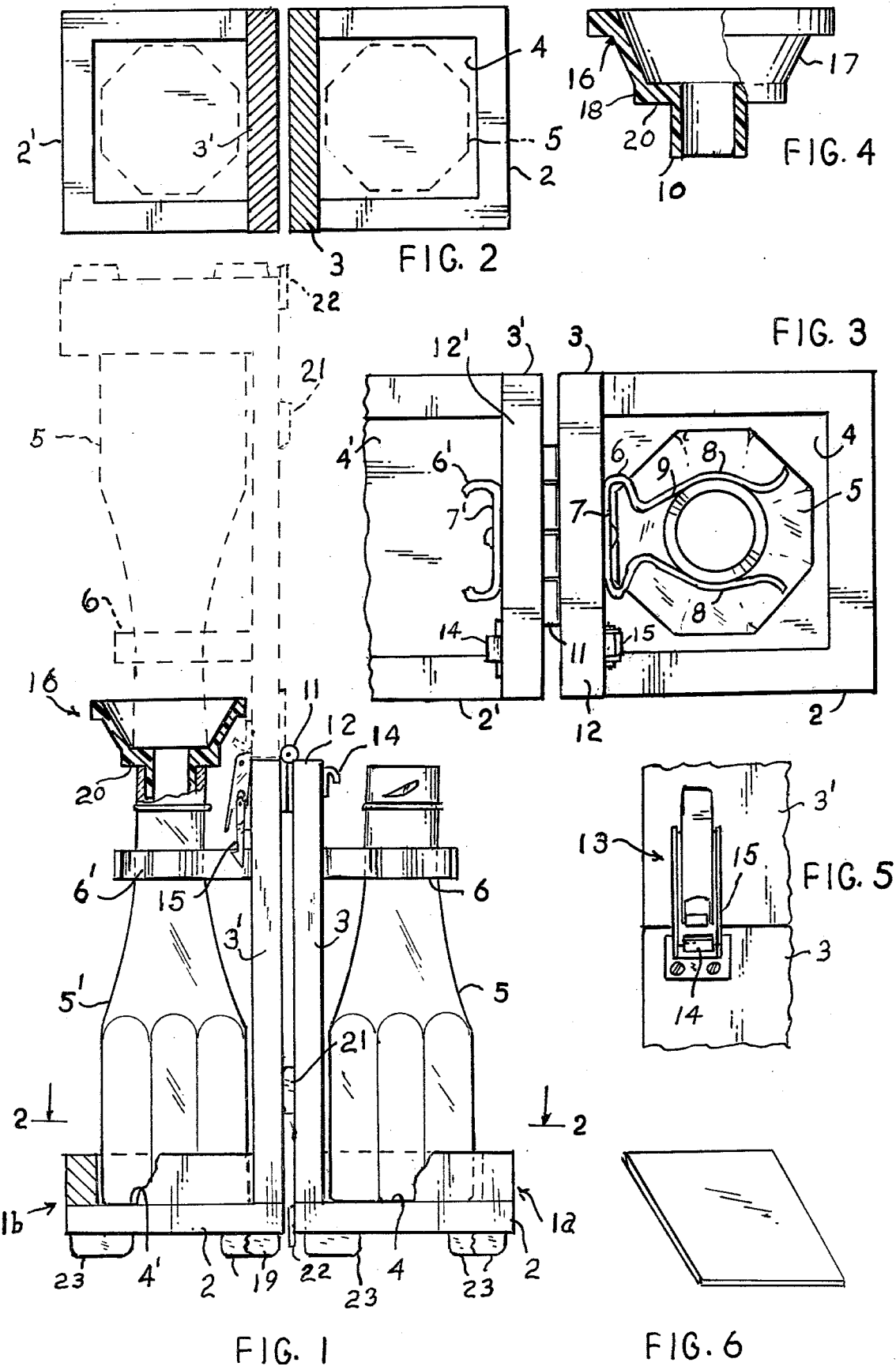
U.S. Patent  Aug. 19, 1980  4,217,941

KETCHUP RAPPING APPARATUS

BACKGROUND OF THE INVENTION

This invention is directed to apparatus for transferring ketchup from one narrow-necked ketchup bottle to another, and which apparatus is adapted to be rapped against a solid surface to effect relief of any clogged condition in the flow of the ketchup that might arise in the process.

Apparatus of this nature is needed particularly in restaurants, where it is customary to refill ketchup bottles remaining partially filled in order to avoid waste by transferring the contents from one partially filled bottle into another. The slow moving characteristics of ketchup, together with the narrow necks of the glass bottles, not only makes the refilling process time consuming, but also presents other problems; such as clogging of the ketchup flow, leakage, and possible chipping of the bottles.

Devices attempting to supply this need are known from U.S. Pat. Nos. 3,877,499; 3,266,533; 3,156,272; and 3,261,380. In these patents the bottle to be drained is set by hand in an inverted position over the bottle to be filled, and it is either coupled to the latter bottle by means of a coupling element, as in the first three of these patents; or it is left in glass-to-glass contact, as in the fourth patent. These several devices lack an efficient means for obtaining a quick inversion of the one bottle relative to the other. Spillage is likely to occur by the time the inversion is properly obtained. The coupling elements without more are in inadequate support for the heavy inverted glass bottles, so that the coupled bottles would be in an accident prone condition. In the patent where the inverted bottle is left in glass-to-glass contact with the lower bottle, not only leakage but also chipping of the bottles is likely during the inversion process.

U.S. Pat. Nos. 3,860,048 and 3,286,849 also disclose apparatus for transferring fluid from one bottle to another. However, in these the apparatus is cumbersome; and the bottles to be drained obtain an undesirable angular position subjecting the draining fluid to exposure and possible contamination.

Further, the arrangements in these known devices appear to be impractical to permit the apparatus to be sharply rapped against a solid surface when it is desired to hasten ketchup flow of to dislodge a clogged flow condition. Such action could possibly result in toppling, cracking or dislodging the bottles.

SUMMARY OF THE INVENTION

Accordingly, the present invention is directed to imroving over these known devices and providing apparatus for facilitating the transfer of ketchup from one narrow-necked bottle into another without the accompanying faults of these known devices.

It is further intended by the present invention to provide a manually portable apparatus which is practical in its mode of use, and is efficient in effecting transfer of ketchup from one conventional ketchup bottle to another; which is designed to permit quick inversion and alignment of one bottle relative to the other for this purpose without damage to the bottles; and which is of a construction enabling it to be rapped sharply against a solid surface without damage in order to speed up ketchup flow or to relieve a clogged flow condition.

In accordance with the invention there is provided portable apparatus for effecting transfer of ketchup from one narrow-necked bottle to another, comprising a pair of L-form racks, each rack having a base member and an upright back member, each base member having a recess in its upper face for seated disposition therein of one of the bottles, clamp means fixed to each rack for securing the related bottle in seated position, a hinge connecting the racks to one another enabling pivoting of one rack relative to the other from a back-to-back relationship of the racks through 180 degrees to an opposed inverted vertical position in which the mouth ends of the bottles seated in the racks are disposed in aligned opposed relationship.

BRIEF DESCRIPTION OF THE DRAWING

FIG. 1 is a view in side elevation of apparatus embodying the invention, showing in full line the normal or back-to-back position of the racks, and showing in broken line the 180 degree pivoted position of one rack and its related bottle relative to the other rack and its related bottle;

FIG. 2 is a section on line 2—2 of FIG. 1, the bottles being shown in broken line;

FIG. 3 is an enlarged plan view of FIG. 1, portions being broken away to avoid unnecessary detail and to promote added clarity;

FIG. 4 is a view in side elevation of the guide cup, sectioned in part;

FIG. 5 is a view illustrating an engaged condition of the latch; and

FIG. 6 is a perspective view of an insert that might be used beneath a bottle to adjust its height, when needed, in its rack.

DESCRIPTION OF PREFERRED EMBODIMENT

The invention will now be described with reference to the accompanying drawing sufficiently and in such concise manner as to enable persons having ordinary skill in the art to understand and use the invention.

The apparatus shown in the drawing as illustrating an embodiment of the invention includes, see FIG. 1, a pair of bottle stands or racks 1a and 1b of similar structure.

(It is to be noted that the components of rack 1a are designated in this description and the drawing by unprimed reference numbers; and the corresponding components in rack 1b are designated by primed reference numbers.)

Each rack is of L-form, having a flat bottomed base member 2, and an upright vertically extending back member 3. Here, the base members 2 and 2' are shown as square; and the back members 3 and 3' are shown as rectangular. They are not, however, limited to these configurations. Each base member has a recess 4 in its upper face designed to have seated therein a conventional ketchup bottle 5. The recess is of shallow depth; and its cross dimensions are such as to allow the bottom end of the bottle to be easily entered and seated therein, the cross dimension of the recess being only slightly greater than that of the bottle.

A spring pinch clamp 6 is fixed to each rack. It is designed to grip about the neck of the related bottle seated in the rack so as to hold it in its seated position. The clamp has a bridgepiece 7 fixed to the inner face of the back member of the rack. A pair of spring arms 8 extends forwardly from the bridgepiece in overhanging relation to the recess of the rack. The arms are tensioned toward each other so as to provide a narrow entrance to an inner annular wider area 9. The latter has a lesser diameter than the neck of the bottle to be clamped therein. Accordingly, upon the neck of the bottle being forced between the arms 8 and entered into the area 9, the arms become clamped about the neck of the bottle sufficiently to hold the bottle seated in the rack.

The racks 1a and 1b have a normal back-to-back collapsed position, as indicated in full line in FIG. 1. A leaf hinge 11 mounted between the upper rear areas of the back members is provided, whereby rack 1a may be turned or pivoted on the hinge relative to rack 1b through 180 degrees to an inverted vertical position, as indicated by the broken line in FIG. 1. As the rack is pivoted, the bottle 5 seated therein is carried with it.

The pivoted rack obtains an inverted position in which a top flat end surface 12 of its back member 3 abuts upon a corresponding end surface of the other rack 1b; in which the inverted back member 3 is disposed linearly in extension of the other back member 3'; in which the base member 2 of the inverted rack is disposed opposite to and aligned in overhead parallel relation with the other base member 2'; and in which the inverted bottle 5 is axially aligned with the other bottle 5'.

Suitable fastening means, such as a hasp or latch 13 is provided. It serves as a means for rigidly retaining the pivoted rack in its inverted position against collapse, as when it is desired to move the apparatus from one location to another; or when it is desired to rap the heel area of the lower rack member 1b of the apparatus against a solid surface to relieve a clogged ketchup flow condition.

The latch 13 is a conventional spring type. It comprises a hook element 14 fixed proximate the upper edge of the inner face of the back member 3 of rack 1a; and a lever pivotable catch 15 mounted to a corresponding face of the other back member 3'. After the pivoted rack 1a has obtained its inverted position (broken line, FIG. 1) the catch 15 is enabled to be manually pivoted to engage with the hook element 14 so as to lock the pivoted rack in its inverted position to rack 1b. FIG. 5 shows the hook and catch elements in an engaged locked relationship.

A guide cup member 16 is adapted to be fitted to the non-inverted bottle, here bottle 5'. It serves to guide the bottle to be inverted, here bottle 5, downward to an inverted vertical position in which it is aligned with the lower bottle 5', as indicated by the broken line in FIG. 1. The guide cup is formed of resilient material, such as plastic. It includes an upper truncated coned cup portion 17 having a flat bottom wall 18 from which a cylindrical tube 10 depends axially.

Tube 10 is adapted to be slidably inserted into the mouth end of the lower or non-inverted bottle 5', as appears in FIG. 1. The bottom wall 18 of the cup defines an annular under-shoulder 20 which is adapted to rest upon the mouth end of the non-inverted bottle 5'. The major inner diameter of the cup is adequate to allow the mouth end of the bottle being inverted to be carried angularly down into the cup until the bottle attains an inverted vertical position seated upon the inner surface of the bottom wall of the cup and in vertical alignment with the lower bottle 5', as in FIG. 1.

In using the apparatus to effect transfer of the contents of one partially filled ketchup bottle into another, the bottles are first seated and clamped into their respective racks. The bottle 5' seated in rack 1b is then fitted with the tube 10 of the guide cup 16. The rack 1a containing bottle 5 is then manually pivoted on the hinge 11 through 180 degrees carrying bottle 5 with it. As the latter is carried angularly downward to its inverted position, it enters the coned cup 16 and is guided by the latter so as to come to rest upon the inner surface of the bottom wall of the cup in a vertical inverted position with its mouth end aligned with that of the lower bottle 5'. The resilient shock absorbing nature of the bottom wall of the cup protectively cushions the bottles as the inverted bottle 5 obtains the latter position.

The thickness of the bottom wall 18 of the cup member is equal to the total difference in length of the back members 3 and 3' of the racks relative to the slightly shorter bottles seated in the racks. The bottom wall of the cup in this respect serves as a washer or seal between the mouth ends or rims of the aligned bottles 5 and 5'.

If a shorter bottle than is customary is to be seated in one of the racks, then a compensating flat, thin insert (FIG. 6), to the extent needed, is placed beneath the bottle to obtain the desired height condition.

The apparatus is equipped with means which enables it, after it has obtained the extended position with rack 1a inverted relative to rack 1b, to be manipulated so as to speed flow of the slow moving ketchup or to relieve any clogged condition that may be impeding the flow. To this end, the base member 2' of of rack 1b is provided at its underside rear or heel area with foot pads 19 formed of shock absorbing material, such as rubber. To obtain the relief mentioned, the user manually grips one of the back members 3 or 3' and then thrusts the apparatus angularly downward so as to rap or impact the heel area of the lower base member 2' against a solid surface. The resultant jarring of the apparatus operates to relieve the clogged condition and to speed up the flow of ketchup.

In using the apparatus to obtain the relief mentioned, there is no likelihood of damage resulting to either the apparatus or to the bottles, since the force of the impacts is absorbed not only by the foot pads 19 beneath the base member 2' of the rack at the heel area but also by the aligned back members 3 and 3' of both racks.

Here, there is a foot pad 19 at each of the two rear corners of the heel area of the base member 2'. However, any other suitable padding arrangement for this purpose may be used. The foot elements 23' located at the opposite or forward two corners of the base member 2', as well as the foot elements 23 located at the four corners of the base member 2 of rack 1a are not required to be formed of shock absorbing material. It is to be appreciated that the foot pad 19 may take the form of a single strip at the heel area.

A rubber button 21 fixed to the rear face of the back member 3 of the apparatus, as indicated in FIG. 1, serves to cushion the inverted rack 1a as it is returned to the back-to-back normal position of the apparatus.

Suitable means, such as a pender or eyelet 22 may be fixed to rack member 1a as a means of suspending the apparatus from a support after rack member 1a has obtained its inverted position.

The racks 1a and 1b may be formed of any suitable material for the purpose intended, such as wood, metal, or plastic.

While an embodiment of the invention has been illustrated and described in detail, it is to be expressly understood that the invention is not limited thereto. Various changes of form, design or arrangement may be made in its parts without departing from the spirit and scope of the invention. It is my intention, therefore, to claim the invention not only as shown and described but also in all such forms, modifications or equivalents thereof as might be reasonably construed to be within the spirit of the invention when considering the specification, drawing, and the appended claims.

What is claimed is:

1. Portable apparatus for effecting transfer of ketchup from one narrow-necked bottle to another, comprising a pair of L-form racks, each rack having a base member and an upright back member, each base member having a recess in its upper face for seated disposition therein of one of the bottles, clamp means fixed to each rack for securing the related bottle in seated position, a leaf hinge connecting the upper ends of the upright back members of the racks to one another enabling pivoting of one rack relative to the other from a back-to-back normal relationship of the racks through 180 degrees to an opposed inverted position in which the mouth ends of the bottles seated in the racks are disposed in axially aligned opposed relationship one above the other, the base members are disposed in opposed spaced overhead relationship, and the upright back members are disposed in linear extension of each other.

2. Portable apparatus as in claim 1, wherein securing means is carried by the racks for latching them to one another so as to retain them in said opposed inverted position.

3. Portable apparatus as in claim 1, including a guide member formed of resilient material and having a truncated coned upper cup portion provided with a flat bottom wall having an axial opening into a tube depending from the underside of the bottom wall, the tube being adapted to be inserted into the mouth end of the bottle seated in the rack that is not intended to be inverted, the cup portion being adapted to receive and guide down to a seated position upon the flat bottom wall the mouth end of the bottle carried by the other rack upon pivoting of the latter rack to its inverted position.

4. Portable apparatus as in claim 3, wherein the back members are slightly greater in height than the bottles when seated therein, and the flat bottom wall of the cup portion has a thickness corresponding to the total difference in the overall height of the back members relative to that of the slightly shorter bottles.

5. Portable apparatus as in claim 4, wherein the flat bottom wall defines an annular shoulder at its underside that is seatable upon the mouth end of the bottle in which the tube is fitted and provides an annular upper surface for seating engagement with the mouth end of the bottle carried by the pivoted rack.

6. Portable apparatus as in claim 5, wherein the flat bottom wall is of resilient plastic material and defines a cushion and seal between the mouth ends of the bottles in the inverted position of the one bottle relative to the other.

7. Portable apparatus as in claim 2, wherein the means for latching the racks to one another is mounted in part on each rack and the separate parts are engageable with one another in latching relationship subsequent to the pivoted rack obtaining the inverted position.

8. Portable apparatus as in claim 7, wherein the base member of the rack not intended to be inverted has a heel area at its underside below the related back member provided with shock absorbing means for cushioning the apparatus against damage in the event the user of the apparatus subjects the said heel area to rapping action against a solid surface to effect relief of a clogged ketchup flow condition.

9. Apparatus for effecting a vertical inversion of a narrow-necked ketchup first bottle relative to a narrow-necked ketchup second bottle so as to allow gravity flow of the contents of the inverted first bottle down into the second bottle, the apparatus comprising a first and a second L-form rack, each rack having a base member and an upright back member and adapted to have seated on its base member one of the bottles in a restrained upright normal position, a truncated coned cup opening at its bottom into a depending tube, the tube being receivable in the mouth end of the second bottle, the coned cup being adapted for reception of the mouth end of the first bottle upon relative inversion of the latter bottle, a hinge connecting upper ends of the back members of both racks together enabling pivoting of the first rack and the first bottle seated therein from a back-to-back normal position of both racks to an inverted position relative to the second rack, in which position the base member of the inverted first rack is disposed in an overhead aligned spaced relation to the base member of the second rack and in which position the back member of the inverted first rack is disposed in linear vertical extension of the back member of the second rack, and in the pivoting of said first rack relative to the second rack the mouth end of the first bottle being caused to be entered into and guided down the coned cup to a seated position therein in axial alignment with the mouth end of the second bottle.

10. Apparatus as in claim 14, wherein a separate clamp mounted to each upright back member is adapted to receive the neck of a ketchup bottle in an upright position on the related base member so as to restrain the ketchup bottle in a clamped condition against displacement from its seated position.

11. Apparatus as in claim 14, wherein the underside of the base member of the rack that is not inverted defines a heel area provided with shock absorbing material for cushioning the apparatus in the secured position of the inverted rack to enable rapping of said heel area against a solid surface for effecting relief of any clogged condition that might develop in the transfer of ketchup from the inverted bottle to the other.

* * * * *

UNITED STATES PATENT AND TRADEMARK OFFICE
CERTIFICATE OF CORRECTION

PATENT NO. : 4,217,941
DATED : Aug. 19, 1980
INVENTOR(S) : Vitale Catalano

It is certified that error appears in the above-identified patent and that said Letters Patent are hereby corrected as shown below:

Column 1, line 32, "in" should read -- an --; line 47, "of" should read -- or --; line 53, "imroving" should read -- improving --. Column 4, line 60, "ontained" should read -- obtained --. Column 6, lines 44 and 50, the claim reference numeral "14", each occurrence, should read -- 9 --.

Signed and Sealed this

Third Day of February 1981

[SEAL]

Attest:

RENE D. TEGTMEYER

Attesting Officer     Acting Commissioner of Patents and Trademarks